United States Patent [19]

Parker et al.

[11] Patent Number: 5,669,695

[45] Date of Patent: Sep. 23, 1997

[54] HEADLAMP ADJUSTMENT MECHANISM

[75] Inventors: Eric G. Parker, Elgin, Ill.; Albert Willem van Boven, Iserlohn, Germany; Samuel P. Amdahl, Fenton, Mich.

[73] Assignee: Illinois Tool Works Inc., Glenview, Ill.

[21] Appl. No.: 311,479

[22] Filed: Sep. 23, 1994

[51] Int. Cl.⁶ ............................................. B60Q 1/04
[52] U.S. Cl. ............................ 362/66; 362/273; 362/284; 362/421
[58] Field of Search ........................ 362/66, 270, 273, 362/284, 289, 421, 424, 428; 74/110

[56] References Cited

U.S. PATENT DOCUMENTS

| | | |
|---|---|---|
| 4,757,429 | 7/1988 | Ryder et al. |
| 5,214,971 | 6/1993 | Burton et al. |
| 5,258,894 | 11/1993 | Bivens. |
| 5,285,360 | 2/1994 | Kanner ........................... 362/66 |
| 5,390,098 | 2/1995 | Reiland ........................... 362/289 |
| 5,414,602 | 5/1995 | Young et al. ................... 362/66 |

*Primary Examiner*—Y My Quach
*Attorney, Agent, or Firm*—Schwartz & Weinrieb

[57] ABSTRACT

An automotive vehicular headlamp adjustment mechanism comprises a ball rod having a ball element disposed upon a free end thereof for connection to a vehicular headlamp housing. A threaded drive rod, having oppositely disposed threaded sections formed thereon, is rotatably journalled within a bushing member which slidably supports the ball rod for slidable movement in extension and retraction directions. A plurality of pivotable spider elements, in the form of a scissor-jack assembly, interconnect the threaded drive rod and the ball rod such that upon rotation of the threaded drive rod in a first direction, the oppositely threaded sections of the drive rod cause the spider elements to converge toward each other whereby the ball rod is moved toward a retracted position, whereas upon rotation of the threaded drive rod in a second opposite direction, the oppositely threaded sections of the drive rod cause the spider elements to diverge away from each other whereby the ball rod is moved toward an extended position. In accordance with further embodiments of the invention, the ball rod is eliminated and the spider elements, operatively connected to the drive rod, are also operatively connected to bracket or plate members fixed to, for example, a headlamp reflector and the headlamp housing, or alternatively, to the headlamp housing and the vehicle frame, for respectively adjusting the reflector or housing relative to the housing or frame.

38 Claims, 7 Drawing Sheets

HEADLAMP ADJUSTMENT MECHANISM

FIELD OF THE INVENTION

The present invention relates generally to adjustment mechanisms, and more particularly to an automotive headlamp adjustment mechanism for adjusting the angular orientation of an automotive vehicle headlamp assembly in order to properly direct the light beam generated by the vehicle headlamp.

BACKGROUND OF THE INVENTION

Automotive vehicle headlamp mounting and adjustment assemblies, mechanisms, and systems are well-known in the automotive industry and have been employed for many years in order to properly position the headlamp assembly so as to impart a desired directional orientation to the light beam generated by the vehicle headlamp such that the roadway in front of the vehicle can be desirably illuminated in order that the vehicle operator can view the roadway for a sufficiently remote distance and thereby be able to operate the vehicle in a safe manner, and yet such light beam does not, at the same time, present any safety hazard with respect to oncoming vehicular traffic. Typically conventional vehicle headlamp adjustment systems comprise a threaded rod having a ball element fixedly mounted upon one end thereof for universal engagement within a ball socket defined within the headlamp housing, and some means for imparting rotation to the threaded rod as a result of which the rod is linearly moved with respect to a fixed frame element whereby the positional adjustment of the headlamp housing with respect to the fixed frame element is achieved. Such conventional adjustment systems or mechanisms, however, are usually needlessly complex from a torque transmission point of view, and in addition, are also relatively costly and comprise a relatively large amount of weight. Still further, some of the conventional adjustment systems or mechanisms are not readily accessible whereby the actual adjustment process is rendered time-consuming and difficult.

One example of a conventional automotive headlamp adjustment system or mechanism is disclosed within U.S. Pat. No. 4,757,429 issued to Francis E. Ryder and Stephen. P. Lisak on Jul. 12, 1988 wherein, as best seen in FIG. 3 of such noted patent, the adjustment system or mechanism comprises a housing and support member 202, a threaded adjustment shaft or rod 240 having a ball stud portion, not numbered, fixedly mounted upon one end thereof, and a crown or bevel gear 212 operatively connected to the other end thereof. A second crown or bevel gear 210 is enmeshed with the first crown or bevel gear 212, and crown or bevel gear 210 is operatively connected to a rotary drive shaft 206. Rotation of rotary drive shaft 206 therefore imparts rotation to threaded adjustment shaft or rod 240 whereby the same, along with the ball stud portion thereof, is effectively linearly advanced or retracted so as to positionally adjust the headlamp housing with which the ball stud portion is engaged by means of a similarly configured socket or recess, not shown. It is thus appreciated that not only does this conventional type of headlamp adjustment mechanism comprise a significant number of different operative components, but in addition, the rotary torque originally imparted to the rotary drive shaft 206 must, in turn, be transmitted to and through several different components. Still further, different manufacturing tolerances must be achieved and maintained, and the different components must be maintained engaged or enmeshed so as to in fact be able to properly transmit the rotary torque to the threaded rod or shaft 240.

The angular adjustment mechanism disclosed within U.S. Pat. No. 5,214,971 which issued to John E. Burton and Thomas M. Witt on Jun. 1, 1993 is seen to be similar to the adjustment system or mechanism disclosed in the aforenoted U.S. Pat. No. 4,757,429 and is seen to comprise an adjustment screw 16 having a ball-like head 20 fixedly mounted upon one end thereof, and a nut 134 threadedly engaged with another portion of the adjustment screw 16. The nut 134 is provided with, in effect, gear teeth 142 which are enmeshed with gear teeth 116 of a bevel gear portion 114 of a drive gear 110, all as best seen in FIG. 8. Drive gear 110 is provided with, for example, an internal drive socket 122 with which a drive means 150 is adapted to be engaged, as seen in FIG. 1, whereby rotary torque or drive is imparted to drive gear 110 and, in turn, nut 134 so as to threadedly extend or retract the adjustment screw 16 in order to achieve the headlamp adjustment as desired. The drawbacks of this adjustment system or mechanism are submitted to be similar to those noted in connection with the Ryder and Lisak system or mechanism noted hereinabove.

Lastly, as an alternative type of vehicular headlamp adjustment assembly as compared to those assemblies noted above within the Ryder and Lisak, and Burton and Witt patents, the headlamp adjustment assembly disclosed within U.S. Pat. No. 5,258,894 issued to Steven L. Bivens on Nov. 2, 1993, and assigned to the same assignee as that of the present patent application, is seen to comprise an adjustment screw 14 having a sphere or ball-like terminal member 22 at one end thereof, and a rotatable stem 18 at the opposite end thereof. An adjuster nut 10 is threadedly engaged with the adjustment screw 14 whereby the latter may be threadedly adjusted so as to in turn adjust the positional disposition of the sphere or ball-like terminal member 22 and thereby the headlamp housing. While the system or assembly of Bivens is seen to be significantly simplified as compared to the systems or assemblies of Ryder and Lisak, and Burton and Witt, the orientation of the drive axis of the rotatable stem 18 of the adjustment screw 14 is different from that of Ryder and Lisak, and Burton and Witt, whereby input accessibility to the system or assembly of Bivens may have to be alternatively provided for or accommodated within the headlamp assembly in order to achieve the desired adjustment thereof.

A need therefore exists for a new and improved vehicular headlamp adjustment system or mechanism which can achieve adjustments to the vehicular headlamps while exhibiting improved characteristics with respect to conventional vehicular headlamp adjustment systems or assemblies.

OBJECTS OF THE INVENTION

Accordingly, it is an object of the present invention to provide a new and improved automotive vehicular headlamp adjustment mechanism, system, or assembly.

Another object of the present invention is to provide a new and improved automotive vehicular headlamp adjustment mechanism, system, or assembly which overcomes the various drawbacks and deficiencies of the prior art conventional headlamp adjustment assemblies.

Still another object of the present invention is to provide a new and improved automotive vehicular headlamp adjustment mechanism, system or assembly which is comprised of a limited or small number of relatively simple components.

Yet another object of the present invention is to provide a new and improved automotive vehicular headlamp adjustment mechanism, system or assembly which is economical to manufacture.

A further object of the present invention is to provide a new and improved automotive vehicular headlamp adjustment mechanism, system, or assembly which requires only a limited amount of rotary torque in order to actuate the same between extended and retracted positions in order to achieve desired adjustments to the headlamp housing.

Still yet another object of the present invention is to provide a new and improved automotive vehicular headlamp adjustment mechanism, system, or assembly which slidingly supports the ball-rod in a stable manner relative to the headlamp housing frame member.

Yet still another object of the present invention is to provide a new and improved automotive vehicular headlamp adjustment mechanism, system, or assembly which may be fabricated from a suitable plastic material and is therefore light in weight.

A still further object of the present invention is to provide a new and improved automotive vehicular headlamp adjustment mechanism, system, or assembly which eliminates the need for intermeshing gears characteristic of the prior art conventional headlamp adjustment systems or assemblies in order to achieve extended of retracted movement of the ball rod assembly.

A yet further object of the present invention is to provide a new and improved automotive vehicular headlamp adjustment mechanism, system or assembly which is simple to operate and which is readily accessible so that adjustments to the vehicle headlamp housing may be easily achieved.

A still yet further object of the present invention is to provide a new and improved automotive vehicular headlamp adjustment mechanism, system, or assembly which comprises a number of interchangeable or reversible component parts whereby the manufacture and assembly of the system or mechanism is simplified and rendered cost-effective.

A yet still further object of the present invention is to provide a new and improved automotive vehicular headlamp adjustment mechanism, system, or assembly wherein the various component parts thereof are readily snap-fitted together whereby no separate or special fasteners are required in order to assemble the system or mechanism.

An additional object of the present invention is to provide a new and improved automotive vehicular headlamp adjustment system, mechanism, or assembly wherein the ball rod assembly is able to be eliminated and a threaded drive screw, scissor-type screw jack mechanism is simply connected either between a reflector element of the headlamp assembly and the headlamp housing, or between the headlamp housing and the vehicle frame, in order to achieve the desired adjustment of vehicular headlamp assembly.

SUMMARY OF THE INVENTION

The foregoing and other objects of the present invention are achieved through the provision of a new and improved automotive vehicular headlamp adjustment mechanism, system or assembly which comprises a bushing member which is adapted to be fixedly mounted upon a portion of the automotive vehicular frame, and an actuating ball rod slidably disposed within the bushing member. The ball rod has a ball element fixedly mounted upon a free distal end portion thereof for matingly engaging a ball-type socket defined within the vehicle headlamp housing so as to appropriately move or positionally adjust the vehicle headlamp housing as the ball rod is slidably moved within and with respect to the bushing member and the vehicle frame in an extended or retracted mode. A threaded drive screw or rod is rotatably mounted within the bushing member so as to extend in a direction which is substantially perpendicular to the direction in which the ball rod extends, and a plurality of hinged elements, defining, in effect, a scissor-type screw jack mechanism, interconnect opposite end portions of the threaded drive screw or rod and a proximal end portion of the ball rod. The opposite end portions of the threaded drive screw or rod have oppositely oriented threaded portions comprising right and left hand threaded screw sections, and consequently, when the threaded drive screw or rod is rotated in a first rotary direction, the oppositely oriented threaded screw sections thereof respectively cause respective portions of the hinged elements threadedly engaged therewith to diverge or move apart with respect to each other whereby the ball rod is caused to be extended. In a similar manner, when the threaded drive screw or rod is rotated in a second opposite rotary direction, the oppositely oriented threaded screw sections thereof respectively cause respective portions of the hinged elements threadedly engaged therewith to converge or move toward each other whereby the ball rod is caused to be retracted. In this manner, positional adjustment of the vehicle headlamp housing, with respect to the vehicle frame, is achieved.

In accordance with a first embodiment of the invention, embodying the principles or general characteristics of the ball-rod type adjustment system, mechanism, or assembly as set forth hereinabove, the hinged elements may form, in effect, a half scissor-type jack mechanism, whereas in accordance with a second embodiment of the present invention, embodying the principles or general characteristics of the ball-rod type adjustment system, mechanism, or assembly as set forth hereinabove, the hinged elements may form, in effect, a whole or full scissor-type jack actuating mechanism. In accordance with a still further third embodiment of the present invention, also embodying the principles or general characteristcs of the ball-rod type adjustment system, mechanism, or assembly as set forth hereinabove, the hinged elements may comprise a whole or full scissor-type jack actuating mechanism which comprises additional jack elements which, together with one set of the jack or hinged elements of, for example, the second embodiment of the present invention, define a parallelogram type linkage mechanism which provides additional stability, support, and control to the entire scissor-type jack actuating mechanism.

In accordance with a fourth embodiment of the present invention, which effectively departs from the teachings of the first three embodiments of the invention as briefly described above, in that the ball rod and the ball element thereof have been eliminated from the adjustment system, mechanism, or assembly, there is provided an adjustment system, mechanism, or assembly wherein a pair of suitable mounting brackets or plates are provided for respective connection to the vehicle headlamp reflector and the vehicle headlamp housing, or to the vehicle headlamp housing and the vehicle frame, whereby the reflector or housing are able to be suitably adjusted with respect to the housing or frame, respectively. Full or whole scissor-type hinged jack elements interconnect the plates or brackets and are actuated by means of a double-threaded drive rod or screw, and in accordance with a fifth embodiment of the invention, the plate or bracket components comprise identical parts each defining one-half of the scissor-jack mechanism or assembly.

BRIEF DESCRIPTION OF THE DRAWINGS

Various other objects, features, and attendant advantages of the present invention will be more fully appreciated from the following detailed description, when considered in connection with the accompanying drawings, in which like reference characters designate like or corresponding parts throughout the several views, and wherein.

DETAILED DESCRIPTION OF THE ILLUSTRATED EMBODIMENTS

Referring now to the drawings, and more particularly to FIGS. 1–4 thereof, there is shown a first embodiment of an automotive vehicular headlamp adjustment mechanism wherein the mechanism is generally indicated by the reference character 10. The mechanism 10 is seen to comprise a ball rod 12 which has a ball element 14 integrally formed upon a free end of the ball rod 12 and which is adapted to be seated within a ball-type pocket or recess, not shown, defined within a vehicular headlamp housing, also not shown, in a conventional manner so as to impart the desired adjustment to the headlamp housing as the ball rod 12 is moved in either one of two linear directions, that is, either forwardly or backwardly, as schematically illustrated by means of the double arrowhead A.

The ball rod 12 is slidably disposed within a tubular bushing 16, and it is seen that the bushing 16 is provided at a substantially axially central portion thereof with a circular flange member 18. In addition, the outer peripheral surface of the bushing 16 is also provided within a plurality of arcuate shaped ribs, detents, or the like 20. The ribs or detents 20 are circumferentially and equiangularly spaced with respect to each other about the outer periphery of the bushing 16 and are located axially forwardly of the circular flange member 18 so as to be axially spaced therefrom by means of a predetermined axial distance or spacing which will correspond to the axial thickness of a support panel, not shown, of the vehicle frame upon which the bushing 16 is able to be mounted. In particular, the vehicle frame support panel will be provided with a plurality of apertures corresponding to the number of ribs or detents 20 provided upon the bushing 16 such that the ribs or detents 20 of the bushing 16 can be inserted through such apertures of the support panel until the rear surface of the support panel abuts the front surface of the circular flange member 18. The bushing member 16 can then be rotated a predetermined arcuate extent so as to lock the bushing 16 upon the support panel in a bayonet locking mode. In view of the disclosure illustrating three circumferentially spaced ribs or detents 20, wherein the ribs or detents 20 will be arcuately spaced with respect to each other through means of an arcuate extent of approximately 120°, the bushing member 16 is rotated approximately 60° in order to effect the bayonet locking mode of the bushing 16 with respect to the vehicle frame support panel. It is to be understood, of course, that if a different number of ribs or detents 20 is employed upon the bushing 16, then the arcuate or circumferential spacing between respective ribs or detents 20 will be accordingly different which, in turn, will lead to a different predetermined amount of rotation of the bushing member 16 with respect to the vehicle frame support panel when the bayonet locking of the former is to he achieved with respect to the latter.

A rear portion of the bushing 16 is further integrally provided or formed with a box portion 22 having a configuration which is substantially that of a rectangular solid. The rearward portion of the ball rod 12 passes through the box portion 22 of the bushing 16 so as to likewise be slidably journalled therein, and the box portion 22 of the bushing 16 is further provided with two pairs of transversely extending support arms 24. As viewed in FIG. 1, the support arms 24 comprise a pair of upper arms and a pair of lower arms, and the upper arms are laterally spaced with respect to each other by means of a transversely defined slot 26, while the lower arms are similarly laterally spaced with respect to each other by means of a transversely oriented slot 28. The transverse slot 26 terminates at an enlarged circular aperture 30 while transverse slot 28 similarly terminates at an enlarged circular aperture 32, the apertures 30 and 32 being coaxially aligned with respect to each other. The bushing member 16, as well as the ball rod 12, may be fabricated from a suitable plastic material, such as, for example, nylon, and consequently, the arms 24 are somewhat flexible with respect to each other so as to permit the snap-fit engagement therebetween of a threaded drive rod 34. In order to achieve such snap-fit engagement of the drive rod 34 within or between the support arms 24, the drive rod 34 is provided, as viewed along the longitudinal axis 36 of the drive rod 34, with a pair of axially spaced circumferentially recessed portions 38 whereby the drive rod 34 is effectively rotatably journalled with respect to the support arms 24. The diameter of each recessed portion 38 is greater than the width of each slot 26 or 28 such that when the recessed portions 38 of the drive rod 34 are introduced into .the respective slots 26 and 28 and between the arms 24, the arms 24 defining the slots 26 and 28 will be somewhat expanded so as to permit the recessed portions 38 to be moved inwardly toward the apertures 30 and 32 whereupon reaching the same, the recessed portions 38 of the drive rod 34 will be accommodated within the apertures 30 and 32, and the arms 24 will effectively return to their non-expanded normal states or positions so as to partially circumferentially embrace or envelop the recessed portions 38 of the drive rod 34 thereby journalling the recessed portions 38 of the drive rod 34 therebetween.

The drive rod 34 has a substantially axially central non-threaded portion 40 interposed between the recessed portions 38, and a first threaded portion 42 extending axially away from one of the recessed portions 38, and a second threaded portion 44 extending axially away from the other one of the recessed portions 38. The threaded portions 42 and 44 are provided with oppositely disposed or directionally oriented threads such that one of the portions comprises a right-hand threaded portion, and the other one of the threaded portions comprises a left-hand threaded portion. The significance of such oppositely threaded portions will become apparent from the disclosure which follows hereinafter, and it is further noted that, as viewed in FIG. 1, the upper end of the threaded drive rod 34 can be suitably connected to a rotary drive means, not shown, for a purpose which will also become apparent from the disclosure which follows hereinafter.

Figure 1:
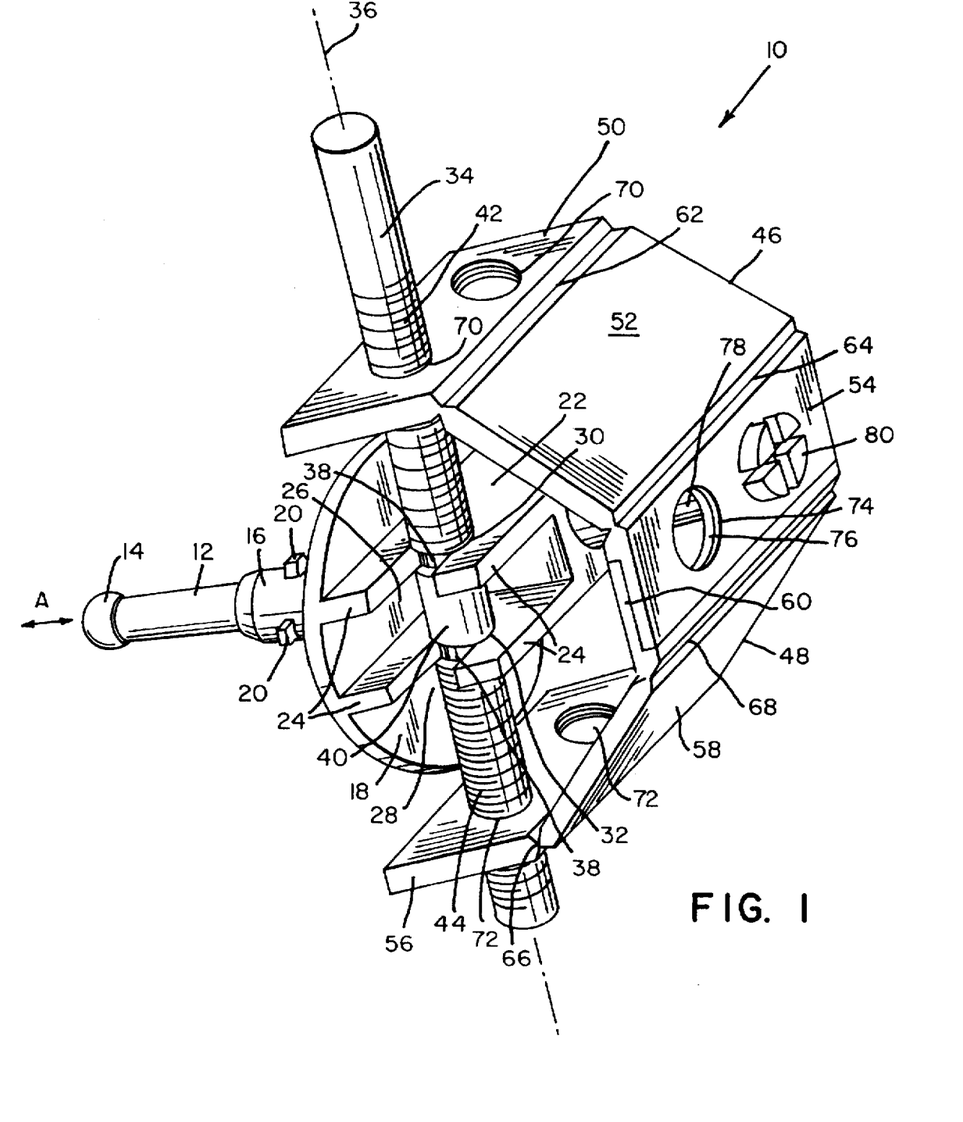
FIG. 1 is a left-rear perspective view of a first embodiment of an automotive vehicular headlamp adjustment mechanism constructed in accordance with the principles of the present invention.
Figure 2:
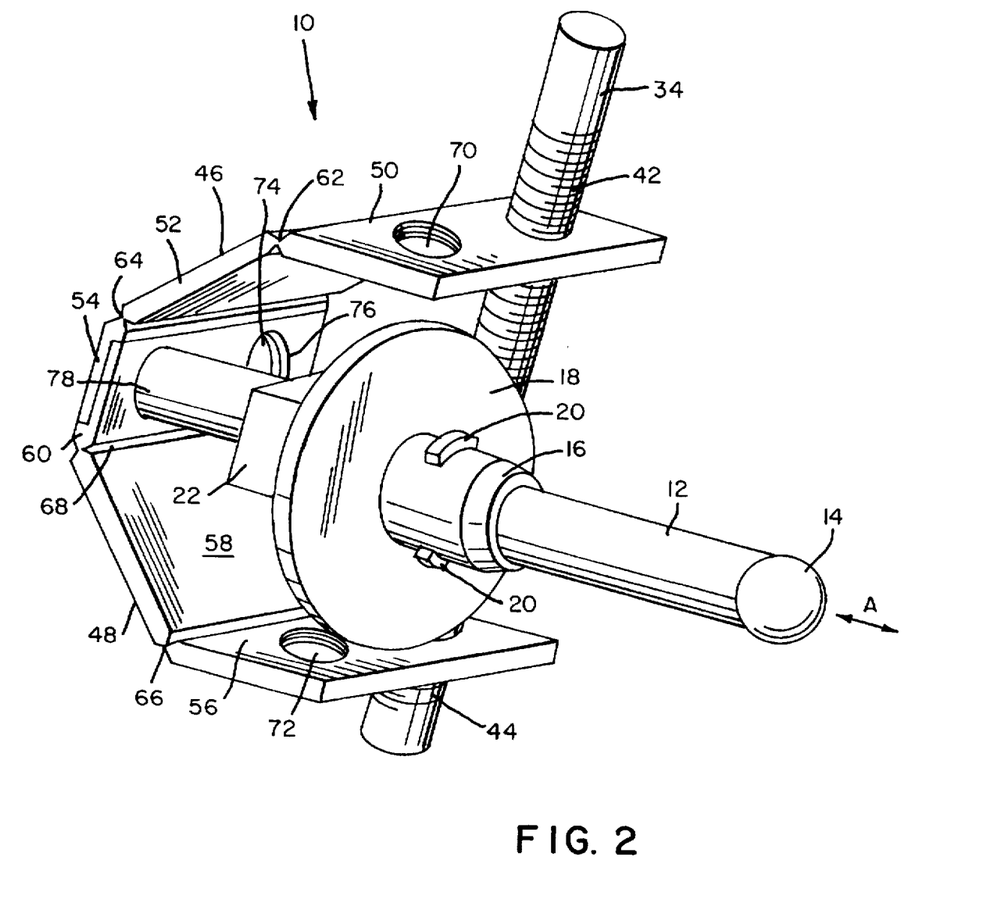
FIG. 2 is a right-front perspective view of the headlamp adjustment mechanism shown in FIG. 1.

With continued reference to FIGS. 1 and 2, the headlamp adjust mechanism 10 is seen to further comprise a pair of spider elements 46 and 48 each of which comprises three sections 50,52,54, and 56,58,60, respectively, which are pivotably connected to each other by means of living hinge mechanisms 62,64 and 66,68. Sections 50 and 56 are respectively provided with a pair of apertures 70 and 72 by means of which the sections 50 and 56 are threadedly engaged with the respective threaded portions 42 and 44 of the threaded drive rod 34. In a similar manner, the sections 54 and 60 are also provided with a pair of transversely spaced apertures 74 and 76 which are coaxially aligned with respect to each other as a result of the spider element sections 54 and 60 being overlapped upon one another. In this manner, the rear end section 78 of the ball rod 12 may be secured upon the spider elements 46 and 48, and particularly within the spider element sections 54 and 60. In particular, the rear head portion 80 of the ball rod 12 may be slotted in mutuality orthogonal directions such that the slotted portions of the head 80 can be radially compressed, inserted through the aligned apertures 74 and 76 of the spider element sections 54 and 60, and thereafter permitted to radially expand so as to be effectively locked upon or within the spider element sections 54 and 60. Of course it is to be appreciated that other types of locking or securing means may be employed in lieu of the slotted head portion 80 of the ball rod 12 in order to secure the rear head portion 80 within or upon the spider element sections 54 and 60. It is also to be appreciated that by means of the provision of the pairs of transversely spaced apertures 70, 72, 74, and 76, the spider elements 46 and 48 may be effectively interchanged or alternatively disposed. In addition, the relative disposition of the threaded drive rod 34 and the ball rod 12 may also be reversed or alternated, that is, in lieu of the drive rod 34 being disposed within the left pair of aligned apertures 70 and 72 of the spider element sections 50 and 56, as viewed in FIG. 1, the drive rod 34 may be disposed within the right pair or set of aligned apertures 70 and 72 of the spider element sections 50 and 56, and similarly, in lieu of the ball rod rear end 80 being secured within the right set of aligned apertures 74,76 of the spider elements 54 and 60, the ball rod rear end 80 may be secured within the left set of aligned apertures 74,76 of the spider elements 54 and 60 depending upon the particular space accommodations within the vehicle.

Figure 3:
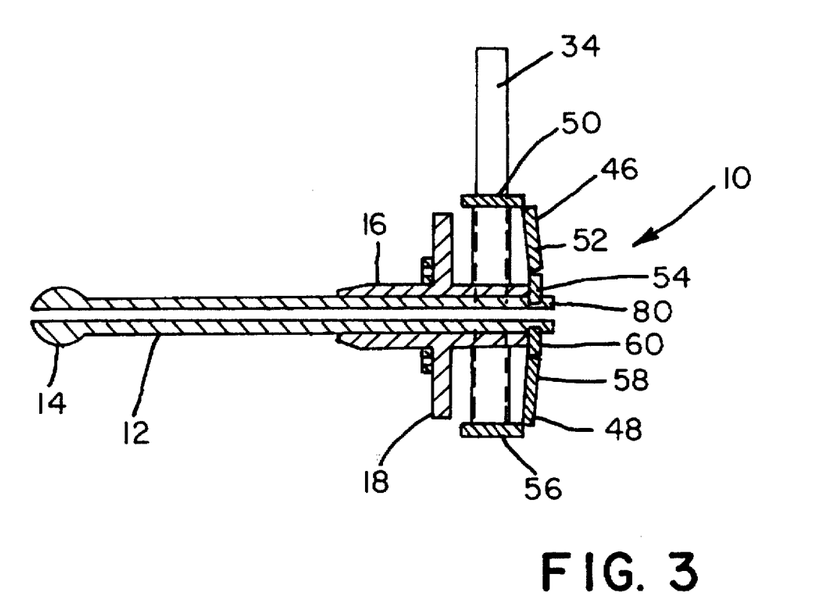
FIG. 3 is a schematic diagram of the headlamp adjustment mechanism disclosed within FIGS. 1 and 2 when the hinged elements thereof are disposed in their relatively divergent positions so as to move the ball-rod to its extended position.
Figure 4:
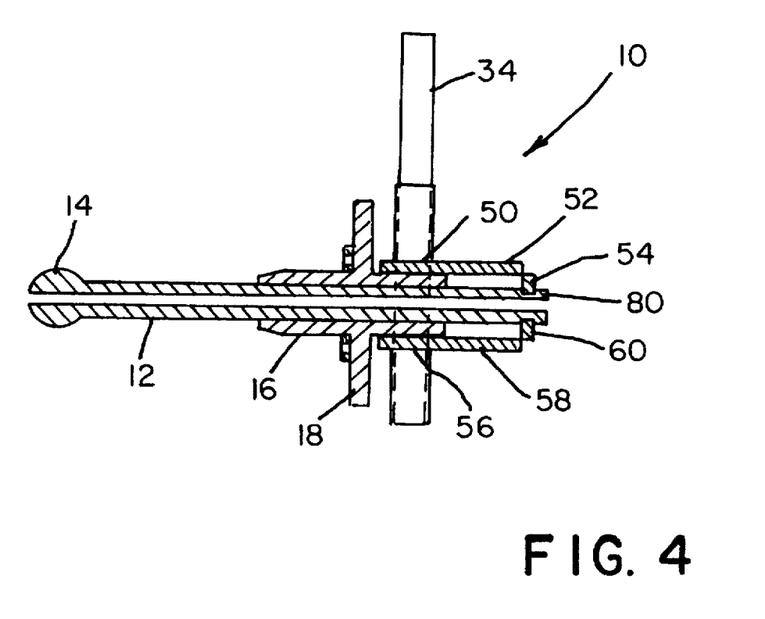
FIG. 4 is a schematic diagram of the headlamp adjustment mechanism disclosed within FIGS. 1 and 2 and similar to the diagram of FIG. 3, showing however the hinged elements thereof when disposed in their relatively converged positions so as to move the ball rod to its retracted position.

In operation, and with additional particular reference being made to FIGS. 3 and 4, when the rotary drive rod 34 is rotated in a particular direction, the spider element sections 50 and 56 will be caused to converge toward each other as shown in FIG. 4 whereby the spider element sections 54 and 60 will be moved axially away from the bushing 16 so as to, in turn, axially move the rear end or head portion 80 of the ball rod 12 axially rearwardly away from the bushing 16 such that the ball rod 12, and the ball element 14 thereof are now disposed in a retracted position. Alternatively, when the rotary drive rod 34 is rotated in the opposite direction, the spider element sections 50 and 56 diverge with respect to each other as shown in FIG. 3 whereby the spider sections 54 and 60 are moved axially toward the bushing 16 so as to, in turn, axially move the rear end or head portion 80 of the ball rod 12 axially forwardly toward the bushing 16 such that the ball rod 12 and the ball element 14 thereof are now disposed in an extended position. It is of course to be understood that intermediate positions of the spider element sections, and the ball rod 12 and ball element 14 thereof, are attainable depending upon the amount of rotation imparted to the rotary drive rod 34.

While it has been noted that the bushing member 16 and the ball rod 12 can be fabricated from a suitable plastic material, such as, for example, nylon, the rotary drive rod 34 is preferably fabricated from a suitable metal material, although alternatively, such drive rod 34 can likewise be fabricated from a suitable plastic material, such as, for example, nylon. In a similar manner, the spider elements 46 and 48 may likewise be fabricated from the same or a similarly suitable plastic material, such as, for example, nylon. Still further, it is to be noted that the mechanical structure or mechanism comprising the spider elements 46 and 48 when taken together define or comprise, in effect, a one-half scissor-jack mechanism, however, depending upon space accommodations within the vehicle and within the vicinity of the vehicular headlamp housings, other spider adjustment or scissor-jack mechanisms may be alternatively employed.

Figure 5:
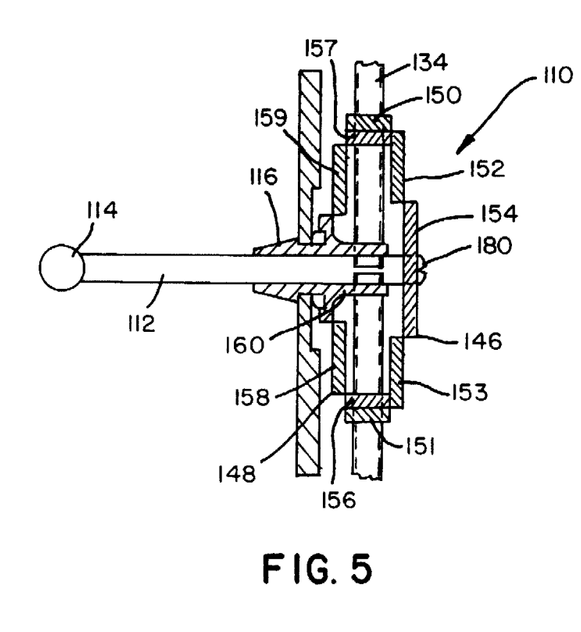
FIG. 5 is a schematic diagram of a second embodiment of an automotive vehicular headlamp adjustment mechanism constructed in accordance with the principles of the present invention and showing the hinged elements thereof disposed in their relatively divergent positions so as to move the ball rod to its extended position.
Figure 6:
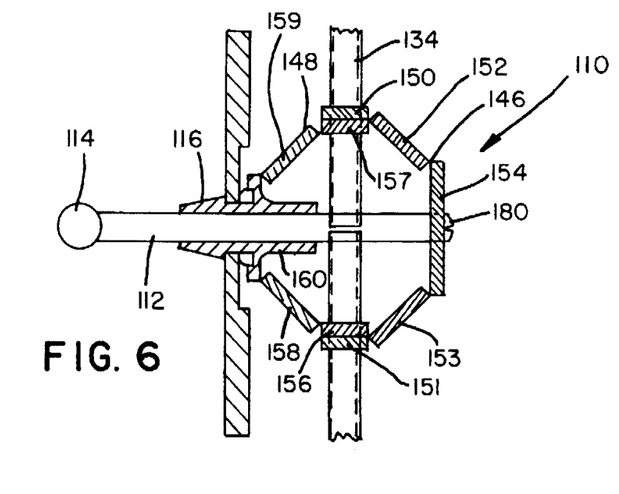
FIG. 6 is a schematic diagram of the headlamp adjustment mechanism disclosed within FIG. 5, showing however the hinged elements when they are disposed in a position which is intermediate their fully divergent and fully convergent positions whereby the ball rod is disposed at a partially extended/retracted position.
Figure 7:
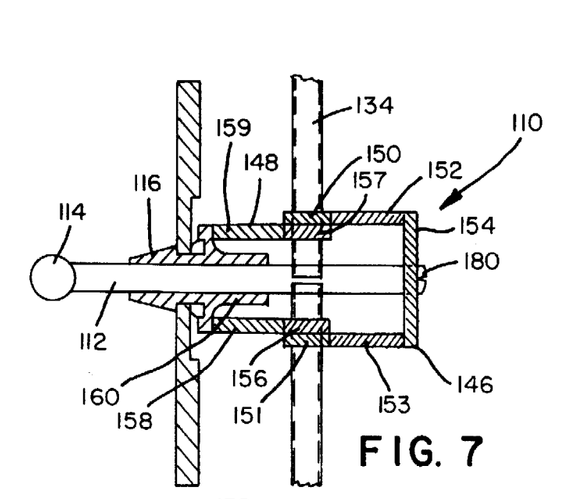
FIG. 7 is a schematic diagram of the headlamp adjustment mechanism disclosed within FIGS. 5 and 6, showing, however, the hinged elements when they are disposed at their fully convergent positions so as to, in turn, dispose the ball rod at its retracted position.

For example, with reference being made to FIGS. 5-7, a second embodiment of the present invention is disclosed and is seen to comprise an automotive vehicular headlamp adjustment mechanism which is generally indicated by the reference character 110, and which can be characterized as a full scissor-jack spider mechanism. For consistency with respect to the various embodiments of the present invnetion, like reference characters will be employed throughout the various views of the drawings in order to designate like or corresponding parts, and in connection with the embodiment of FIGS. 5-7, parts thereof corresponding to like or similar parts of the embodiment of FIGS. 1-4 will be given similar reference characters except that such reference characters will be in the 100 series. As can best be appreciated from FIGS. 5-7, in lieu of the spider elements 46 and 48 of the embodiment of FIGS. 1-4 wherein each spider element 46 and 48 comprised three pivotable sections, the spider elements 146 and 148 respectively comprise five spider element sections 150, 151, 152, 153, 154, and 156, 157, 158, 159, 160, the latter section 160 being integrally formed as a rear section of the bushing 116. It is further noted that instead of the spider elements 146 and 148 being overlapped at their respective sections within which the rear or head end of the ball rod is secured, in accordance with this embodiment, spider element sections 150 and 157, and 151 and 156 overlap each other as a result of all of such sections being threadedly engaged upon opposite ends of the rotary drive rod 134. The basic operation of this embodiment is essentially the same as the operation of the embodiment of FIGS. 1-4 in that as the rotary drive rod 134 is rotated in a first direction, the spider sections 150,157 and 151,156 will be moved toward each other as shown in FIG. 7 whereby section 154 will be caused to move away from the bushing 116 and the spider section 160 such that the rear or head end 180 of the ball rod 112 is moved rearwardly whereby the ball rod 112 and the ball element 114 thereof are disposed in a relatively retracted position. Conversely, when the rotary drive rod 134 is rotated in a second opposite direction, the spider sections 150,157 and 151,156 are moved away from each other as shown in FIG. 5 whereby section 154 will be caused to move toward the bushing 116 and the spider section 160 such that the rear or head end 180 of the ball rod 112 is moved forwardly as a result of which the ball rod 112 and the ball element 114 are disposed in a relatively extended position. An intermediate position of the ball rod 112 and ball element 114 is illustrated in FIG. 6 wherein the rotary drive rod 134 has been rotated in a particular direction so as to move the spider elements or sections away from either one of the extreme extended or retracted positions illustrated respectively in FIGS. 5 and 7.

Figure 8:
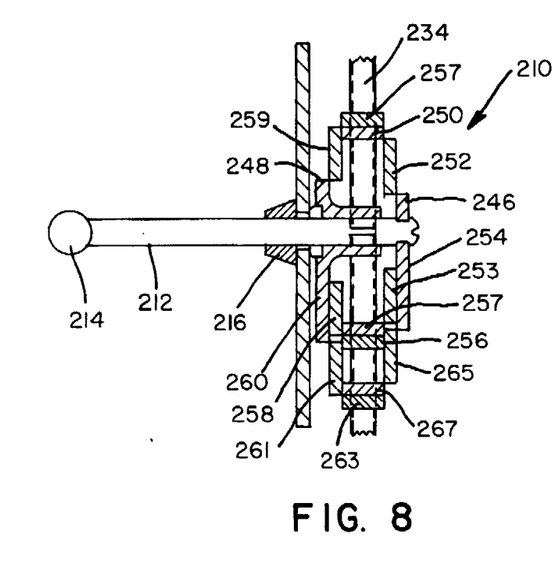
FIG. 8 is a schematic diagram of a third embodiment of an automotive vehicular headlamp adjustment mechanism constructed in accordance with the principles of the present invention and showing the hinged elements thereof disposed at their relatively fully divergent positions so as to dispose the ball rod at its extended position.
Figure 9:
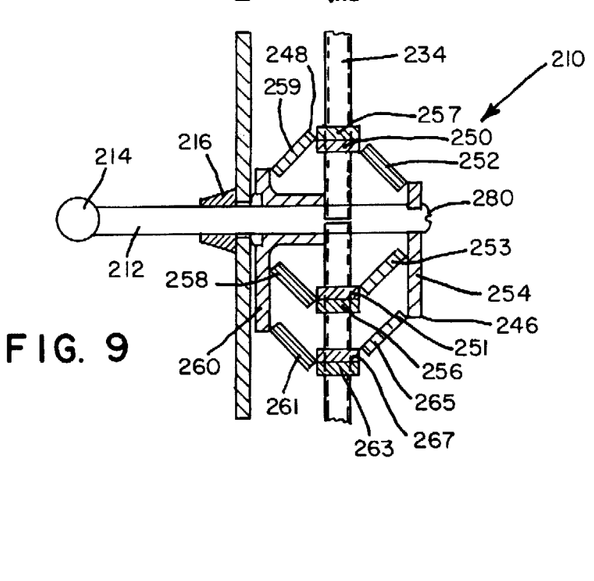
FIG. 9 is a schematic diagram of the headlamp adjustment mechanism disclosed within FIG. 8, showing, however, the hinged elements when they are disposed at a position which is intermediate their fully divergent and fully convergent positions whereby the ball rod is disposed at a partially extended/retracted position.
Figure 10:
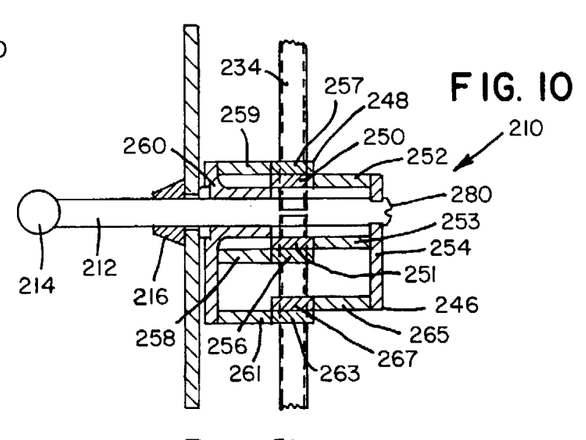
FIG. 10 is a schematic diagram of the headlamp adjustment mechanism disclosed within FIGS. 8 and 9, showing, however, the hinged elements when they are disposed at their fully convergent positions so as to dispose the ball rod at its retracted position.

Continuing still further, a third embodiment of the present invention is illustrated in FIGS. 8-10 and is seen to be similar to the embodiment of FIGS. 5-7, except for the differences noted hereinbelow, and this embodiment is seen to be generally indicated by the reference character 210. In addition, all of the corresponding elements or components of this embodiment, which are similar or correspond to like components of the previous embodiments, are designated by similar or corresponding reference characters except that the reference characters will be in the 200 series. Consequently, with particular reference being made to FIGS. 8-10 and the third embodiment of the invention illustrated therein, a similar full or whole scissors jack mechanism is illustrated, except that in conjunction with the spider elements 251, 253, 256, and 258, there is provided additional spider elements 267, 265, 263, and 261, respectively. It is seen that the spider elements 263 and 267 overlap each other as a result of being threadedly engaged upon the lower end of the threaded rotary drive rod 234, as viewed in the FIGURES, and that elements 263 and 267 are axially spaced along the drive rod 234 from the overlapped elements 251 and 256. In addition, element 265 is disposed parallel to element 253, and element 261 is disposed parallel to element 258. Spider elements 254 and 260 have also been extended downwardly as viewed in the drawing FIGURES so as to provide necessary support locations for the spider elements 261 and 265, and as a result of the noted dispositions of the various spider elements, it is seen that rotary drive rod 234, along with spider elements 251, 253, 254, 265, and 267 define a first interrelated spider element system having the configuration of a parallelogram, and similarly, rotary drive rod 234, along with spider elements 256, 258, 260, 261, and 263 define a second interrelated spider element system also having the configuration of a parallelogram. Such parallelogram structural systems provide additional support, as well as stable and controlled movement to the entire adjustment mechanism 210, however, it is to be noted that such a system or mechanism 210 does entail additional space requirements as compared to the systems or mechanisms 10 and 110 illustrated respectively within FIGS. 1-4 and 5-7.

With continued reference being made to FIGS. 8-10, it can be appreciated that the basic operation of this embodiment of the present invention is essentially the same as the operations attendant the embodiments of FIGS. 1-4 and 5-7. In particular, when the rotary drive rod 234 is rotated in a particular direction, the spider elements 251,256 and 263, 267 approach spider elements 250,257 such that spider element 254 is moved rearwardly away from the spider element 260 whereby the rear or head portion 280 of the ball rod 212 is likewise moved rearwardly away from the spider element 260 so as to move the ball rod 212 and the ball element 214 thereof to a retracted position. Conversely, when the rotary drive rod 234 is rotated in the opposite direction, the spider elements 251,256 and 263,267 move away from spider elements 250,257, as seen in FIG. 8, such that spider element 254 is moved forwardly and approaches spider element 260. Accordingly, the rear or head portion 280 of the ball rod 212 is likewise moved forwardly and approaches the spider element 260 whereby the ball rod 212 and the ball element 214 thereof is moved to an extended position. Rotation of the rotary drive rod 234 in a particular direction so as to move the spider elements away from either one of the extended or retracted positions respectively illustrated in FIGS. 8 and 10 results in the disposition of the ball rod 212 and the ball element 214 thereof at some position intermediate the extreme extended or retracted positions, such an intermediate position being illustrated within FIG. 9.

Figures 11, 12, 13:
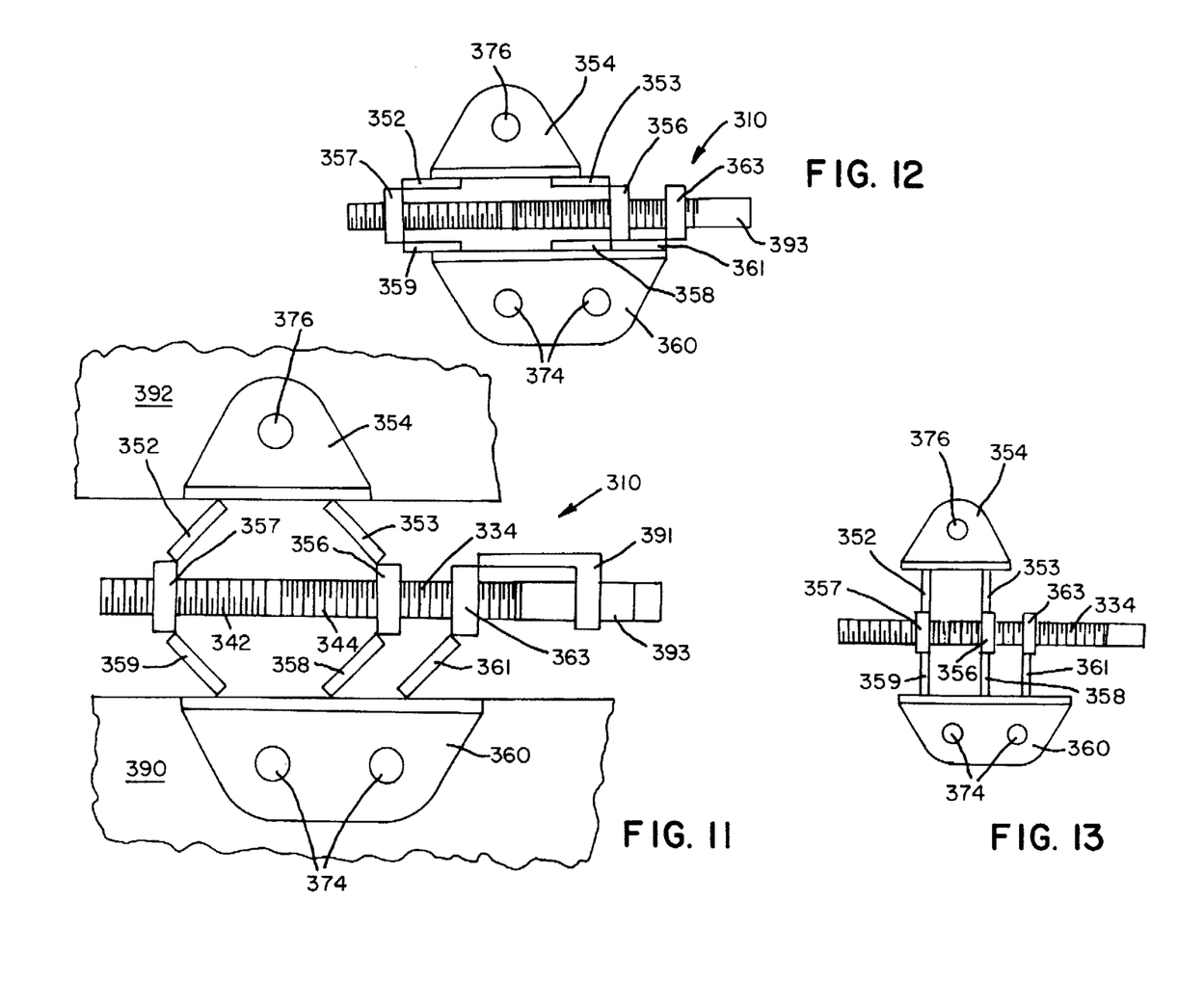
FIG. 11 is a schematic diagram of a fourth embodiment of an automotive vehicular headlamp adjustment mechanism constructed in accordance with the principles of the present invention and comprising a full scissors-type jack mechanism which permits elimination of the ball rod element of the first, second, and third embodiments of the present invention, and wherein the hinged elements of this jack mechanism are disposed at a position which is intermediate their fully divergent and fully convergent positions whereby headlamp reflector or housing is disposed at a partially extended/retracted position with respect to the headlamp housing or vehicle frame, respectively.
FIG. 12 is a schematic diagram of the headlamp adjustment mechanism disclosed within FIG. 11, showing, however, the hinged elements when they are disposed at their fully divergent positions so as to dispose the reflector or housing at its retracted position.
FIG. 13 is a schematic diagram of the headlamp adjustment mechanism disclosed within FIG. 11, showing, however, the hinged elements when they are disposed at their fully convergent positions so as to dispose the reflector or housing at its extended position.
Figure 14:
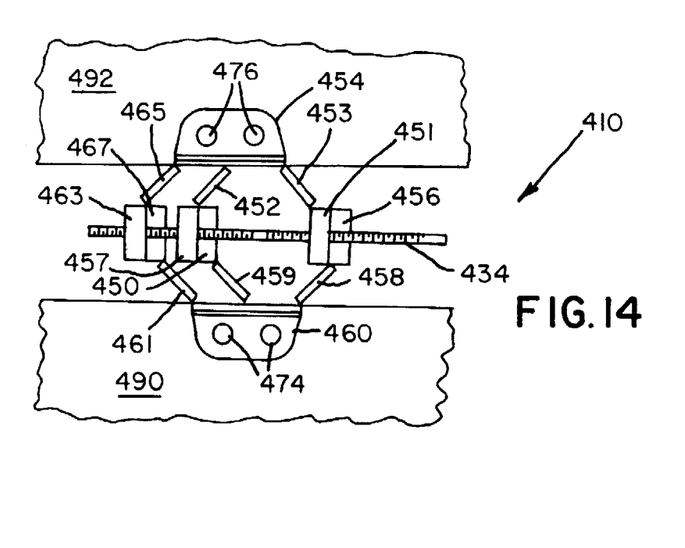
FIG. 14 is a schematic diagram similar to that of FIG. 11, showing, however, a fifth embodiment of an automotive vehicular headlamp adjustment mechanism constructed in accordance with the principles of the present invention and comprising a modification of the jack mechanism comprising the fourth embodiment shown in FIG. 11.

With reference now being made to FIGS. 11-13, a fourth embodiment of the present invention is illustrated and is seen to be generally indicated by the reference character 310, all of the elements or components of this embodiment, which are similar or correspond to like components of the previous embodiments, being designated by similar or corresponding reference characters except that the reference characters are noted as being in the 300 series. It is additionally seen that this fourth embodiment is quite different from the three embodiments of the present invention previously disclosed and described, and illustrated within FIGS. 1–10, in that the ball rod element or component has been eliminated. In lieu thereof, the fourth embodiment of FIGS. 11–13 is seen to comprise a plate or bracket 360 which is provided with a pair of apertures 374 by means of which the plate or bracket 360 may be fixedly secured to either the headlamp housing or vehicle frame 390 as a result of suitable fasteners, not shown, being inserted through the apertures 374. A second plate or bracket 354 is similarly provided with an aperture 376 such that a fastener, not shown, being inserted through the aperture 376, can fixedly mount the bracket 354 upon the vehicle headlamp reflector or headlamp housing 392 in order to provide adjustable movement of the reflector or housing 392 with respect to the housing or vehicle frame 390, respectively. In other words, the present invention mechanism 310 can be used to movably mount a headlamp reflector 392 upon the headlamp housing 390, or alternatively, to movably mount a headlamp housing 392 upon a vehicle frame 390.

The fixed and movable brackets or plates 360 and 354 are interconnected by means of a plurality of spider elements 352, 353, 358, and 359, through the intermediary of a pair of nut elements 356 and 357 which are threadedly engaged upon a threaded, rotary drive rod 334 which is provided with oppositely oriented threaded sections 342 and 344. An end portion of the threaded drive rod 334 is provided with a knurled section 393, and a lock mechanism 391 is operatively associated with the knurled section 393 of the rotary drive rod 334 so as to effectively lock the rotary drive rod 334 in a predetermined rotary position when the rod 334 is rotated in a particular direction so as to achieve a desired adjustment of the mechanism 310, or alternatively, it may be considered that the locking mechanism 391 interacts with the knurled section 393 of the rotary drive rod 334 so as to generate resistance to rotary motion to such an extent that desired rotary movement of the drive rod 334, in order to achieve a desired adjustment of the mechanism 310, is able to be readily achieved, however, inadvertent rotary movement of the drive rod 334, and therefore inadvertent movement of the spider elements 352, 353, 358, 359, bracket or plate 354, and the headlamp reflector or housing 392, is effectively prevented. An additional nut element 363 and spider element 361 operatively interconnect the locking mechanism 391 and the rotary drive rod 334 to the fixed bracket 360 operatively connected to the headlamp housing or vehicle frame 390.

Operation of this fourth embodiment of the present invention is seen to be somewhat similar to the operations of the previously described embodiments. Rotation of the threaded drive rod 334 in a first particular direction will cause the nut elements 356 and 357 to effectively diverge with respect to each other whereby plate or bracket 354 is effectively moved toward plate or bracket 360 such that the headlamp reflector or housing 392 is moved to a retracted position relative to the headlamp housing or vehicle frame 390, as illustrated in FIG. 12. In a similar but opposite manner or mode of operation, when the rotary drive rod 334 is rotated in a reverse direction, the nut elements 356 and 357 converge toward each other upon the drive rod 334 such that the spider elements 352, 353, 358, and 359 cause the bracket or plate 354 to effectively move away from the bracket or plate 360 whereby the headlamp reflector or housing 392 attached to the bracket or plate 354 is effectively moved away from the fixed housing or vehicle frame 392 to which the bracket or plate 360 is fixedly secured, as shown in FIG. 13.

Figure 15:
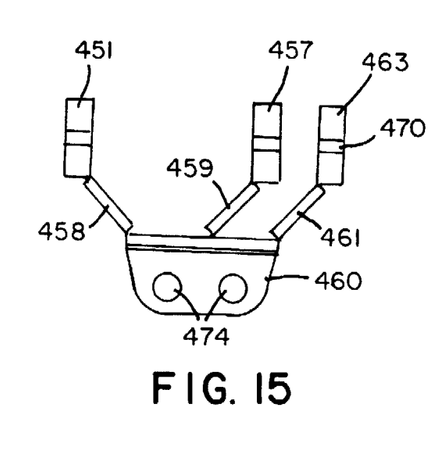
FIGS. 15 and 16 are, respectively, front elevation and side elevation views of one of the scissor-jack components comprising the full scissor-jack mechanism of FIG. 14.

With reference now being made to FIGS. 14–18, a fifth embodiment of the present invention is illustrated and is seen to be generally indicated by the reference character 410, all of the elements or components of this embodiment, which are similar or correspond to like components of the previous embodiments, being designated by similar or corresponding reference characters except that the reference characters are noted as being in the 400 series. It is seen that this embodiment is similar to the fourth embodiment of FIGS. 11–13 with the exception that additional spider elements 461 and 465, and nut elements 463 and 467 are provided in a manner similar to the embodiment of FIGS. 8–10 wherein such additional spider elements 461 and 465, and nut elements 463 and 467, effectively form a parallelogram linkage mechanism along with spider elements 452 and 459, as well as nut elements 450 and 457. In addition as can best be appreciated from FIGS. 15 and 16, each of the nut elements of this embodiment, wherein only the nut elements 451, 457, and 463 are shown in FIG. 15, comprise half-nuts which effectively have a substantially elongated C-shaped configuration, the interior portion 470 of which is threaded so as to threadedly engage the threaded rotary drive rod 434. Two half-nuts which comprise half-nut pairs 451, 456, or 450,457, or 463,467 are locked or fastened together so as to maintain the half-nut elements in threaded engagement with the threaded rotary drive rod 434, the locking or fastening means not being shown. It will be further noted that bracket or plate 454 comprises a pair of apertures 476, whereas the plate or bracket 354 of the embodiment of FIGS. 11–13 comprised only a single aperture 376. The reason for this provision of the pair of apertures 476 is that with the provision of the single aperture 376, the bracket 354 may experience some pivotal movement relative to the headlamp reflector or housing 392, whereas, if such is undesirable, such is effectively prevented as a result of the provision of the pair of apertures 476 within the bracket or plate 454. Lastly, it is to be appreciated that the jack mechanism 410 is formed from two half-assemblies comprising the plate or bracket 460, spider elements 458, 459, and 461, and the half-nut elements 451, 457, and 463, and similarly, the bracket or plate 454, the spider elements 453, 452, and 465, and the half-nut elements 467, 450, and 456, and it is seen that each half-assembly of the jack mechanism is identical to the other half-assembly and may therefore be interchanged, reversed, or the like. Such structure permits reduced manufacturing or tooling costs.

Figures 16, 17:
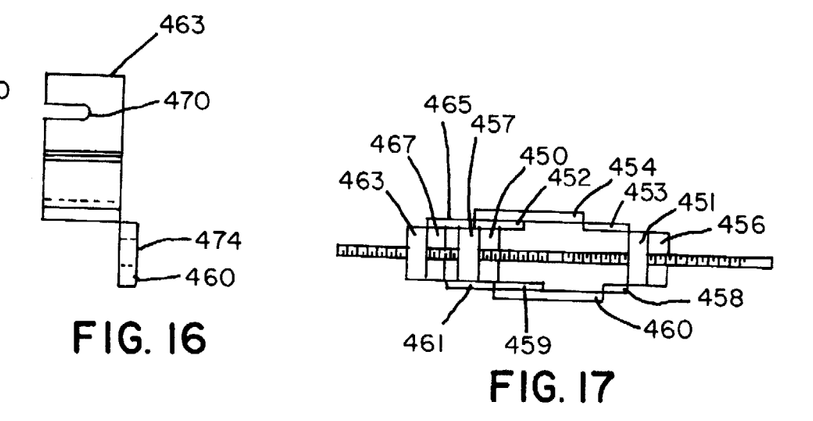
FIGS. 17 and 18 are schematic diagrams, similar to those of FIGS. 12 and 13, showing the scissor-jack mechanism of FIG. 14 in its fully retracted and fully extended modes, respectively.
Figure 18:
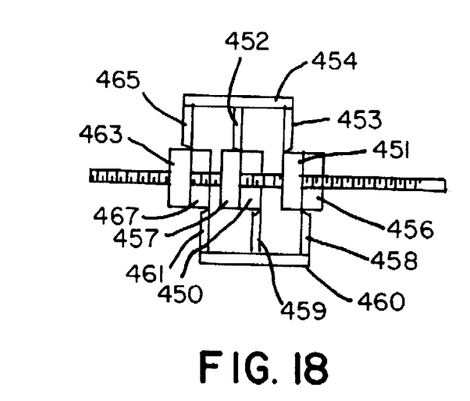

The operation of this embodiment is generally the same as that of the previous embodiments whereupon rotation of the rotary threaded drive rod 434 in a particular direction, the nut elements 463, 467, 457, 450, 451, and 456 will converge toward each other as illustrated in FIG. 18 whereby plate or bracket 454 will be moved away from the plate or bracket 460 whereby the headlamp reflector or housing associated with plate or bracket 454 will be extended. In a converse manner, when the drive rod 434 is rotated in the opposite direction, the nut elements 463, 467, 457, 450, 451, and 456 will diverge away from each other as illustrated in FIG. 17 whereby plate or bracket 454 will be moved toward the plate or bracket 460 whereby the headlamp reflector or housing 492 associated with plate or bracket 454 will be retracted.

As can be appreciated from the foregoing, the present invention has provided a new and improved automotive vehicular headlamp adjustment mechanism, system, or assembly which is a significant improvement with respect to the prior art or conventional vehicular headlamp adjustment mechanisms, systems, or assemblies, particularly in connection with the amount of torque required to actuate or operate the system. In particular, the rotary bevel or crown gear systems characteristic of the prior art have been eliminated, and in lieu thereof, the present invention comprises a single rotary input drive rod and a slidable ball rod, with scissor-jack elements interconnecting the drive rod and the ball rod. In addition, the number of interconnected components comprising the system has been essentially minimized, and the entire mechanism or assembly is light in weight due to its capability of being manufactured from a suitable plastic material, such as, for example, nylon. Still further, the system or mechanism of the present invention is quite cost-effective from a manufacturing point of view as a result of the fact that many of the component parts can be disposed in alternative positions with respect to each other so as to alter the relative disposition of the component parts with respect to each other in order to accommodate space requirements. In accordance with other embodiments of the present invention, the ball rod assembly has so been eliminated thereby simplifying the adjustment mechanism or assembly still further. In accordance with such embodiments, the rotary drive rod operates scissor-jack elements directly connected to suitable plates or brackets which are mounted upon the headlamp reflector or housing, and upon the housing or vehicle frame, respectively, so as to desirably move or adjust the headlamp reflector or housing relative to the headlamp housing or vehicle frame, respectively.

Obviously, many modifications and variations of the present invention are possible in light of the above teachings. It is therefore to be understood that within the scope of the appended claims, the present invention may be practiced otherwise than as specifically described herein and that the rights covered by this patent are not limited only to those embodiments actually illustrated.

What is claimed as new and desired to be protected by means of a United States Patent is:

1. A vehicular headlamp adjustment mechanism, comprising:

a ball rod having a ball element disposed upon a first end portion thereof for connection to a vehicular headlamp housing;

means to be mounted upon a portion of a vehicular frame for slidably supporting said ball rod, and said ball element thereof, such that said ball rod, and said ball element thereof, can be slidably moved in two oppositely disposed directions whereby said ball rod, and said ball element thereof, can be extended out from and retracted into said supporting means;

rotary drive means capable of being rotated in two opposite directions; and expansible/contractible means interconnecting said rotary drive means and said ball rod such that upon rotation of said rotary drive means in a first one of said two opposite directions, said expansible/contractible means will have portions thereof expand and move away from each other such that said ball rod, and said ball element thereof, will be slidably moved in a first one of said two oppositely disposed directions so as to be extended outwardly from said supporting means, whereas upon rotation of said rotary drive means in a second one of said two opposite directions, said expansible/contractible means will have said portions thereof contract and move toward each other such that said ball rod, and said ball element thereof, will be slidably moved in a second one of said two oppositely disposed directions so as to be retracted into said supporting means, and said vehicular headlamp housing may be positionally adjusted.

2. The mechanism as set forth in claim 1, wherein:

said means slidably supporting said ball rod comprises a bushing member which also rotatably mounts said rotary drive means.

3. The mechanism as set forth in claim 2, wherein:

said ball rod has a longitudinal axis along which said ball rod and said ball element is slidably reciprocable in either one of said two oppositely disposed directions; and said rotary drive means comprises a rotary drive rod which has a longitudinal axis disposed substantially perpendicular to said longitudinal axis of said ball rod.

4. The mechanism as set forth in claim 3, wherein:

said rotary drive rod has at least one circumferentially recessed portion; and said bushing member comprises at least one pair of transversely spaced arms disposed within diametrically opposite portions of said at least one circumferentially recessed portion of said rotary drive rod for rotatably journalling said rotary drive rod upon said bushing member.

5. The mechanism as set forth in claim 4, wherein:

said at least one circumferentially recessed portion of said rotary drive rod comprises two circumferentially recessed portions axially spaced along said rotary drive rod; and said at least one pair of transversely spaced arms of said bushing member comprises two pairs of transversely spaced arms respectively disposed within said two, axially spaced, circumferentially recessed portions of said rotary drive rod.

6. The mechanism as set forth in claim 2, wherein:

said bushing member slidably mounting said ball rod and rotatably mounting said rotary drive means comprises a plurality of means for slidably mounting said ball rod and rotatably mounting said rotary drive means at different locations upon said bushing member whereby said ball rod and said rotary drive means can be mounted upon said bushing member at alternative positions in order to accommodate space requirements for said adjustment mechanism with respect to said vehicular frame.

7. The mechanism as set forth in claim 1, wherein:

said rotary drive means comprises a threaded drive rod having oppositely oriented threaded sections defined thereon; and said portions of expansible/contractible means comprises a plurality of elements threadedly connected to said oppositely oriented threaded sections of said threaded drive rod such that upon rotation of said threaded drive rod in a first one of said two opposite directions, said plurality of elements will be caused to divergingly move away from each other such that said ball rod, and said ball element thereof, will be extended with respect to said supporting means, whereas upon rotation of said threaded drive rod in a second one of said two opposite directions, said plurality of elements will be caused to convergingly move toward each other such that said ball rod, and said ball element thereof, will be retracted with respect to said supporting means.

8. The mechanism as set forth in claim 7, wherein:

said plurality of elements comprising said means interconnecting said threaded drive rod and said ball rod are pivotably, connected to each other by living hinge mechanisms; and a second end portion of said ball rod is secured within one of said pivotably connected elements.

9. The mechanism as set forth in claim 7, wherein:

said means slidably supporting said ball rod comprises a bushing member; and said ball rod, said bushing member, and said plurality of elements are fabricated from a plastic material.

10. The mechanism as set forth in claim 9, wherein:

said plastic material, comprises nylon.

11. The mechanism as set forth in claim 7, wherein:

said plurality of elements, in combination with said threaded drive rod, comprise a scissor-jack mechanism.

12. The mechanism as set forth in claim 11, wherein:

said plurality of elements of said scissor-jack mechanism interconnect said threaded drive rod and said ball rod so as to define a one-half scissor-jack mechanism.

13. The mechanism as set forth in claim 11, wherein:

said plurality of elements of said scissor-jack mechanism interconnect said threaded drive rod and said ball rod so as to define a full scissor-jack mechanism.

14. The mechanism as set forth in claim 13, wherein:

said plurality of elements of said scissor-jack mechanism comprise a linkage system having a configuration of a parallelogram.

15. A vehicular headlamp adjustment mechanism, comprising:

a ball rod having a ball element disposed upon a first end portion thereof for connection to a vehicular headlamp housing;

a bushing member, to be mounted upon a portion of a vehicular frame, for slidably supporting said ball rod, and said ball element thereof, such that said ball rod, and said ball element thereof, can be slidably moved in either one of two oppositely disposed directions whereby said ball rod, and said ball element thereof, can be extended out from and retracted into said bushing member;

a threaded rotary drive rod rotatably journalled within said bushing member for selective rotation in either one of two opposite directions; and means having a second end portion of said ball rod connected thereto and opposite end portions of said means threadedly connected to said threaded rotary drive rod such that upon rotation of said threaded rotary drive rod in a first one of said two opposite directions, said end portions of said means will diverge away from each other whereby said ball rod and said ball element thereof will be slidably moved in a first one of said two oppositely disposed directions so as to be extended out from said bushing member, whereas upon rotation of said threaded rotary drive rod in a second one of said two opposite directions, said end portions of said means will converge toward each other whereby said ball rod and said ball element thereof will be slidably moved in a second one of said two oppositely disposed directions so as to be retracted into said bushing member, and said vehicular headlamp housing may be selectively positionally adjusted.

16. The mechanism as set forth in claim 15, wherein:

said ball rod and said threaded rotary drive rod have longitudinal axes which are disposed substantially perpendicular to each other.

17. The mechanism as set forth in claim 15, wherein:

said threaded rotary drive rod comprises oppositely oriented threaded sections with which said opposite end portions of said means are threadedly engaged such that upon rotation of said threaded rotary drive rod in either one of said first and second opposite directions, said opposite end portions of said means will respectively diverge and converge.

18. The mechanism as set forth in claim 15, wherein:

said means having said opposite end portions threadedly connected to said threaded rotary drive rod comprises a plurality of elements pivotably connected to each other such that said plurality of elements, together with said threaded rotary drive rod, comprise a scissor-jack mechanism.

19. The mechanism as set forth in claim 18, wherein:

said scissor-jack mechanism comprises a one-half scissor-jack mechanism.

20. The mechanism as set forth in claim 18, wherein:

said scissor-jack mechanism comprises a full scissor-jack mechanism.

21. The mechanism as set forth in claim 18, wherein:

said scissor-jack mechanism comprises a linkage system which has a configuration of a parallelogram.

22. A vehicular headlamp adjustment mechanism, comprising:

first means for connection to a first vehicular headlamp assembly component;

second means for connection to a second, vehicular headlamp assembly component and for movement in two opposite directions with respect to said first vehicular headlamp assembly component whereby said second vehicular headlamp assembly component can be extended and retracted with respect to said first vehicular headlamp assembly component;

rotary drive means capable of being rotated in two opposite directions; and expansible/contractible means interconnecting said rotary drive means with said first and second connection means such that upon rotation of said rotary drive means in a first one of said two opposite directions, said expansible/contractible means will have portions thereof expand and move away from each other such that said second vehicular headlamp assembly component will be moved in a first one of said two opposite directions with respect to said first vehicular headlamp assembly component, whereas upon rotation of said rotary drive means in a second one of said two opposite directions, said expansible/contractible means will have said portions thereof contract and move toward each other such that said second vehicular headlamp assembly component will be moved in a second one of said two opposite directions with respect to said first vehicular headlamp assembly component, and said second vehicular headlamp assembly component may be effectively adjusted.

23. The mechanism as set forth in claim 22, wherein:

said expansible/contractible means interconnecting said rotary drive means and said first and second connection means comprises a plurality of nuts threadedly engaged upon said rotary drive means, and a plurality of elements pivotably interconnecting said plurality of nuts to said first and second connection means.

24. The mechanism as set forth in claim 23, wherein:

said rotary drive means, said plurality of nuts, and said plurality of pivotably interconnecting elements comprise a scissor-jack mechanism.

25. The mechanism as set forth in 24, wherein:

said scissor-jack mechanism comprises a full scissor-jack mechanism.

26. The mechanism as set forth in claim 24, wherein:

said plurality of pivotably interconnecting elements of said scissor-jack mechanism comprise a linkage system having a configuration of a parallelogram.

27. The mechanism as set forth in claim 23, wherein:

each one of said plurality of nuts comprises a pair of substantially C-shaped nut components fastened together.

28. The mechanism as set forth in claim 22, wherein:

said first vehicular headlamp assembly component comprises a vehicular headlamp housing; and said second vehicular headlamp assembly component comprises a vehicular headlamp reflector.

29. The mechanism as set forth in claim 28, wherein:

said first and second connection means comprise bracket plates for fixed connection to said vehicular headlamp housing and said vehicular headlamp reflector.

30. The mechanism as set forth in claim 28, wherein:

said rotary drive means comprises a threaded drive rod having oppositely oriented threaded sections defined thereon; and said portions of expansible/contractible means comprises a plurality of elements threadedly connected to said oppositely oriented threaded sections of said threaded drive rod such that upon rotation of said threaded drive rod in said first one of said two opposite directions, said plurality of elements will be caused to divergingly move away from each other such that said vehicular headlamp reflector will be retracted as a result of being moved toward said vehicular headlamp housing, whereas upon rotation of said threaded drive rod in said second one of said two opposite directions, said plurality of elements will be caused to convergingly move toward each other such that said vehicular headlamp reflector will be extended as a result of being moved away from said vehicular headlamp housing.

31. A vehicular headlamp adjustment mechanism, comprising:

first means for connection to a vehicular frame upon which a vehicular headlamp assembly is to be adjustably mounted;

second means for connection to a vehicular headlamp assembly housing and for movement in two opposite directions with respect to said vehicular frame whereby said vehicular headlamp assembly housing can be extended and retracted with respect to said vehicular frame;

rotary drive means capable of being rotated in two opposite directions; and expansible/contractible means interconnecting said rotary drive means with said first and second connection means such that upon rotation of said rotary drive means in a first one of said two opposite directions, portions of said expansible/contractible means will expand and move away from each other such that said vehicular headlamp assembly housing will be moved in a first one of said two opposite directions with respect to said vehicular frame, whereas upon rotation of said rotary drive means in a second one of said two opposite directions, said portions of said expansible/contractible means will contract and move toward each other such that said vehicular headlamp assembly housing will be moved in a second one of said two opposite directions with respect to said vehicular frame, and said vehicular headlamp assembly housing may be effectively adjusted.

32. A mechanism as set forth in claim 31, wherein:

said first and second connection means comprise bracket plates for fixed connection to said vehicular frame and said vehicular headlamp assembly housing.

33. The mechanism as set forth in claim 31, wherein:

said rotary drive means comprises a threaded drive rod having oppositely oriented threaded sections defined thereon; and said portions of expansible/contractible means comprises a plurality of elements threadedly connected to said oppositely oriented threaded sections of said threaded drive rod such that upon rotation of said threaded drive rod in said first one of said two opposite directions, said plurality of elements will be caused to divergingly move away from each other such that said vehicular headlamp assembly housing will be retracted as a result of being moved toward said vehicular frame, whereas upon rotation of said threaded drive rod in said second one of said two opposite directions, said plurality of elements will be caused to convergingly move toward each other such that said vehicular headlamp assembly housing will be extended as a result of being moved away from said vehicular frame.

34. The mechanism as set forth in claim 31, wherein:

said portions of expansible/contractible means interconnecting said rotary drive means and said first and second connection means comprises a plurality of nuts threadedly engaged upon said rotary drive means, and a plurality of elements pivotably interconnecting said plurality of nuts to said first and second connection means.

35. The mechanism as set forth in claim 34, wherein:

said rotary drive means, said plurality of nuts, and said plurality of pivotably interconnecting elements comprise a scissor-jack mechanism.

36. The mechanism as set forth in claim 35, wherein:

said scissor-jack mechanism comprises a full scissor-jack mechanism.

37. The mechanism as set forth in claim 35, wherein:

said plurality of pivotably interconnecting elements of said scissor-jack mechanism comprise a linkage system having a configuration of a parallelogram.

38. The mechanism as set forth in claim 34, wherein:

each one of said plurality of nuts comprises a pair of substantially C-shaped nut components fastened together.

* * * * *